United States Patent
Mynett et al.

[11] Patent Number: 5,870,444
[45] Date of Patent: Feb. 9, 1999

[54] METHOD AND APPARATUS FOR PERFORMING VERY FAST MESSAGE SYNCHRONIZATION

[75] Inventors: Thomas M. Mynett, Lilburn; Ali R. Kobari, Lawrenceville; Robert C. Hyers, Tucker, all of Ga.

[73] Assignee: Scientific-Atlanta, Inc., Norcross, Ga.

[21] Appl. No.: 636,670

[22] Filed: Apr. 23, 1996

[51] Int. Cl.[6] .................................................. H04L 7/00
[52] U.S. Cl. ........................ 375/368; 375/366; 370/513
[58] Field of Search ................................. 375/354, 364, 375/365, 366, 368; 370/503, 513, 514, 520; 364/715.11

[56] References Cited

U.S. PATENT DOCUMENTS

| | | | |
|---|---|---|---|
| 4,847,877 | 7/1989 | Besseyre | 375/368 |
| 5,228,036 | 7/1993 | Okamoto et al. | 375/368 |
| 5,526,297 | 6/1996 | Snyder, Jr. et al. | 375/368 |
| 5,550,833 | 8/1996 | Fujisawa | 375/368 |

*Primary Examiner*—Temesghen Ghebretinsae
*Attorney, Agent, or Firm*—Kenneth M. Massaroni; Hubert J. Barnhardt, III; Kelly A. Gardner

[57] ABSTRACT

The present invention discloses a method and apparatus for providing very fast message synchronization of synchronous serial data streams by reducing system reliance on complex and highly computational synchronization schemes. The benefits of the instant invention are realized by performing most of the computational effort during message design, rather than during real-time detection. The synchronization pattern preceding the data stream is constructed in accordance with predetermined rules and compared using multiple bit segment compares rather than performing comparisons bit-by-bit. The synchronization pattern is further provided with an index that is used to access a lookup table that contains information for providing true alignment of the data stream once synchronization has been detected.

37 Claims, 3 Drawing Sheets

| INDEX | BYTE SHIFT COUNT | BIT SHIFT COUNT |
|---|---|---|
| 0 | 31 | 0 |
| 1 | 26 | 5 |
| 2 | 22 | 2 |
| 3 | 17 | 7 |
| 4 | 13 | 4 |
| 5 | 9 | 1 |
| 6 | 4 | 6 |
| 7 | 0 | 3 |

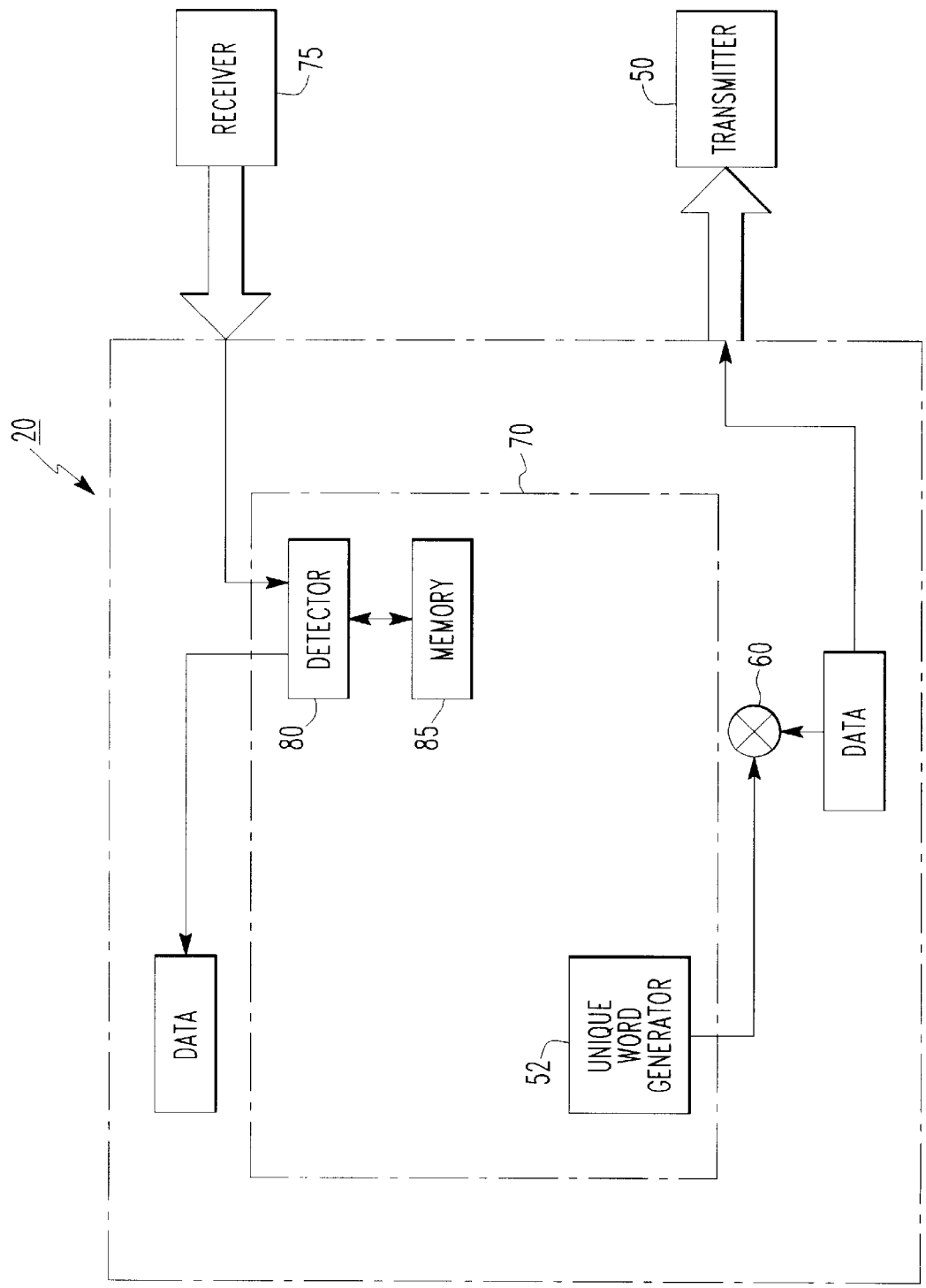

METHOD AND APPARATUS FOR PERFORMING VERY FAST MESSAGE SYNCHRONIZATION

FIELD OF THE INVENTION

The present invention relates generally to the field of performing message synchronization. In particular, the present invention is directed to a method and apparatus for performing very fast message synchronization of, for example, synchronous serial data streams, by reducing system reliance on complex and highly computational synchronization schemes.

BACKGROUND OF THE INVENTION

Digital message synchronization is a process whereby expected data is aligned with received data, thereby allowing synchronization of the received digital data at a data receiver. Conventional methods for determining byte or message alignment within a digital stream of data generally require very high levels of computation power, even for relatively low bit rate data streams. Known systems provide a synchronization detector that is generally realized using discrete hardware, or achieved using a high-speed processor having specialized features, such as, for example a digital signal processor (DSP) or dedicated circuitry in an application-specific integrated circuit (ASIC), or the like.

Using current methods for aligning data can add significant cost and complexity to microprocessor based systems. For example, in known systems, the microprocessor typically consumes large amounts of its computation ability and resources performing, or attempting to perform, rapid real-time shifts and real-time comparisons of the data stream to find a framing pattern or unique word in the received bit stream. The framing pattern is generally contained in the data stream and does not have any known byte boundaries.

General purpose microprocessors are not well suited to performing shifting and masking of relatively long bit streams which are generally required for the detection of sync patterns, i.e., unique words in serial data streams. These problems are further exacerbated when control messages or sync patterns are embedded into a data stream in a relatively asynchronous manner. Conventional methods require the synchronization detector to compare the incoming bit stream to the sync pattern on a bit-by-bit basis, and requires the capability to remember and reexamine the received bits even when only a partial match, generally referred to as a false start, is found. Accordingly, conventional message synchronization systems are inherently inefficient and require a great deal of memory and processing power.

SUMMARY OF THE INVENTION

In general, the deficiencies and disadvantages associated with conventional systems for providing message synchronization are overcome by the principles of the present invention which provides an efficient and rapid means for performing message synchronization. In particular, the present invention is directed to performing a majority of the computation effort associated with message synchronization at one time, during message design and generation, instead of many times in real-time during message reception and synchronization, as is done conventionally. Furthermore, the present invention alleviates the need to store any bits of the message because the invention is inherently resistant to missed sync patterns due to false starts which are commonplace in conventional systems.

Accordingly, it is an object of the present invention to provide a very fast message synchronization system that reduces the real-time computation effort of conventional synchronization detector systems.

It is another object of the present invention to perform a majority of the computation effort during message design, rather than during message transmission and reception, to reduce real-time shifts and compares that are required under conventional schemes.

It is yet another object of the present invention to provide a very fast message synchronization system that is inherently resistant to missed sync patterns due to partial matching or false starts.

Another object of the present invention is to reduce the complexity and cost associated with conventional systems, especially with regard to systems that use a microprocessor for logic and/or control.

In the field of mathematics, a number is considered to be a true prime number if its only factors are one and the number, i.e., the number is not divisible by any number other than itself. A number is relatively prime with respect to another number if the two numbers do not share any common factors. Relatively prime numbers do not have to be true prime numbers. For example, the number four, which is not a true prime number, is relatively prime with respect to the number nine, another non-prime number, because the factors of four are two and two, while the factors of nine are three and three. Accordingly, there are no common factors between the two numbers, and they are considered to be prime with respect to one another.

Accordingly, in addition to overcoming the deficiencies of the prior art, the above and numerous other attendant advantages are achieved by the present invention, which provides a computer-implemented system for synchronizing a data stream, including: generating a synchronization packet comprising a synchronization pattern repeated, the repeated synchronization pattern being n bits in length and being repeated q times, wherein each said repeated synchronization pattern has an index associated therewith, each said index having a length r, where $r=\log_2(q)$, rounded to the next higher integer, wherein r is relatively prime with respect to q and if r is not relatively prime with respect to q, r is increased to the next whole integer that is relatively prime with respect to q; generating a serial message comprising said synchronization packet and the associated indices followed by said data stream; transmitting said serial message; receiving said transmitted serial message; synchronizing said data stream of said transmitted serial message, said synchronizing comprising the steps of: comparing a portion of a first received synchronization pattern of said synchronization packet in said serial message according to a predetermined sampling pattern, said predetermined sampling pattern being q bits in length; matching a portion of one of said repeated synchronization patterns with said sampling pattern, wherein if no match is found in said first received synchronization pattern, repeating said comparison for a next received synchronization pattern until a match is found between said sampling pattern and said portion of said repeated synchronization pattern; determining a number of bits to shift said serial message to bring said data stream into alignment based on the index associated with the matched synchronization pattern, said index being used to determine a number of n-bit segments to read to reach a beginning of said data stream, and a number of bits, x, said data stream must be shifted to bring said data stream into alignment; and shifting said data stream by x bits to bring said data stream into alignment.

BRIEF DESCRIPTION OF THE DRAWINGS

The invention will be described in detail herein with reference to the following drawings in which like reference numerals refer to like elements, and wherein:

FIG. 5 is a block diagram of an apparatus in which the very fast message synchronization according to the present invention is embodied.

DETAILED DESCRIPTION OF PREFERRED EMBODIMENTS

Figure 1:
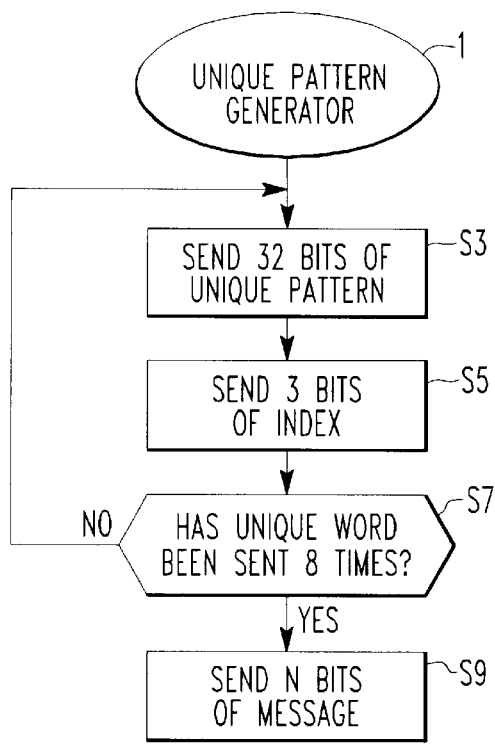
FIG. 1 is a flowchart showing the generation of the synchronization packet according to an embodiment of the present invention.

FIG. 1 shows a flowchart representing synchronization packet generation according to an embodiment of the present invention. For simplicity, the invention will be described with reference to a microprocessor having an efficient byte operation instruction set, as is well known in the art. However, it will be understood that the system of the present invention is equally well suited to shorter, such as, for example, nibble, and longer, such as, for example, word and double word, oriented processors. Moreover, the present invention does not limit the size of the sync pattern that make up the synchronization packet in any way, but may be adapted to the most efficient search sample length for any given processor.

In operation, the present invention precomputes sync patterns based on the type of processor used. The precomputed sync pattern uses more efficient comparisons, in this example, byte comparisons, thereby alleviating the need for bit shifting during the search for an embedded message sync pattern as was done in the prior art. Accordingly, the present invention has the ability to present sync patterns in all possible byte boundary relationships.

For ease of explanation, operation of the system of the present invention will be described herein with respect to a byte oriented synchronization. In a system having byte oriented synchronization, the search for the sync pattern is conducted byte by byte, i.e., in eight-bit segments. Consider, for example, the case of a 32-bit sync pattern. A 32-bit sync pattern is made up of four 8-bit bytes. The sync pattern will be repeated a predetermined number of times, generally corresponding to the number of bits, n, that comprise the orientation of the synchronization processor. Accordingly, in a byte-oriented system the sync pattern is generally repeated eight times to form a synchronization packet, because there are eight bits in a byte. Each of the sync patterns are provided with an index of a predetermined length following the sync pattern. The index is used to access a lookup table that contains information for providing final alignment to a data stream once the sync pattern has been detected, and will be discussed in detail below with respect to FIG. 2.

Referring now to FIG. 1, generation of a synchronization packet is shown in flowchart form. An exemplary 32-bit sync pattern, such as, for example, 0x416C694B, is generated by the sync pattern generator of the system in which the synchronization is to occur. Details of the sync pattern generator will be discussed herein with respect to FIG. 1.

The unique pattern generator generates a pattern that is, for example, four bytes, i.e., 32 bits, in length. The length of the synchronization pattern is determined by the characteristics of the data stream in which the pattern is to be embedded. The length of the sync pattern is chosen to provide the requisite degree of uniqueness to the unique word, i.e., to minimize occurrences of the unique word in the normal data stream. Choosing the length of the sync pattern is within the knowledge of one of ordinary skill in the art. The index is appended to each repeated 32-bit sync pattern for use in later message alignment and processing as set forth below. The process is repeated until the 32-bit sync pattern has been repeated a predetermined number of times, generally corresponding to the number of bits, n, in the synchronization orientation scheme. In the exemplary embodiment discussed herein, the sync pattern is repeated eight times, as there are eight bits in a byte oriented synchronization scheme. Once the sync packet is generated, the data stream is appended thereto and the message, including the sync packet is sent via a transmitter for reception by a receiver that includes the means for synchronizing and aligning the data stream in accordance with the very fast message synchronization of the present invention.

As set forth above, the common case of a microprocessor with an efficient byte-oriented operational instruction set will be used in an exemplary manner to describe the operation of the present invention. It will be noted that the present invention does not limit the size of the synchronization pattern, but can be adapted to the most efficient search sample length for a given processor that is being used. Turning now to the exemplary 32-bit sync pattern, i.e., 0x416C694B, the sync packet is constructed in eight repetitions, each repetition having a 3-bit index associated therewith, to arrive at a 280-bit pattern. Determination and construction of the index associated with each repeated sync pattern will be discussed in detail below. The message or data packet immediately follows the last repetition of the sync pattern and its associated index. In the current example, the entire message sent in the serial data stream is constructed as follows:

(32-bit sync pattern)(index bits=000)(32-bit sync pattern)(index bits=001)(32-bit sync pattern)(index bits=010)(32-bit sync pattern)(index bits=011)(32-bit sync pattern)(index bits=100)(32-bit sync pattern)(index bits=101)(32-bit sync pattern)(index bits=110)(32-bit sync pattern)(index bits=111)(message or data packet)

In constructing the message to be sent in accordance with the present invention, there are at least two design rules that must be followed. The first rule applies to the index associated with each repetition of the sync pattern. It will be appreciated that the number of bits, r, used in the index must contain sufficient bits to provide a unique index for each repeated sync pattern in the sync packet. Accordingly, the index must meet the following two criteria:

A. The total number of bits, r, in the index is computed as $r=\log_2$(number of repetitions) rounded up to the next whole integer; and B. The number of bits, r, in the index, determined in accordance with rule (B) above, must be relatively prime with respect to the number of bits, q, in the predetermined sampling pattern. If r is not relatively prime with respect to q, r is rounded to the next higher integer that is relatively prime with respect to q.

A number is relatively prime with respect to another number if the two numbers do not share any common factors. For example, the number four, which is not a true prime number, is relatively prime with respect to the number nine, because the factors of four are two and two, while the factors of nine are three and three. Where the predetermined sample pattern size is chosen to be eight bits, i.e., as is the case with byte-oriented microprocessor based systems, the number of bits, r, of the index is r=log$_2$(8)=3. Three is relatively prime with respect to eight because the factors of eight are four and two, while the factor of three is three. Accordingly, because three is relatively prime with respect to eight, no further rounding up of the number of bits of the index, r, is required. In an alternative example, suppose the predetermined sample size is chosen to be sixteen bits in length. The number of bits, r, of the index according to rule one is r=log$_2$(16)=4. However, four is a common factor of both sixteen and four. Accordingly, the number r is rounded up to the next higher integer from four that is relatively prime with respect to sixteen, i.e., five. It is also noted that where the predetermined sampling pattern is sixteen, the number of repetitions of the sync pattern will, likewise, be sixteen, as described in detail below.

The second rule applies to determining the number of repetitions of the sync pattern that comprise the sync packet. The number of repetitions of the sync pattern must be equal to the number of bits, q, in the preprogrammed sampling pattern that is used to examine the formatted serial data stream, or conversely, the number of bits in the preprogrammed sampling pattern must equal the number of repetitions of the sync pattern. For example, in a byte-oriented microprocessor system, where byte length sampling patterns are the most efficient, the sample length is eight bits, i.e., one byte. Accordingly, the number of repetitions of the sync pattern is equal to the number of bits in the sampling pattern, i.e., eight bits. Therefore, q is both the number of bits in the preprogrammed sampling pattern and the number of repetitions of the sync pattern that comprise the synchronization packet. It is also noted that q must be greater than or equal to two, and that q is preferably a power of two, such as, for example, 2, 4, 8, 16, 32, 64, etc., as most systems have orientations that are powers of two. It will be understood that longer or shorter bit lengths for the preprogrammed sampling pattern can also be used. According to the above definition of q, the formula for determining r may be restated as follows:

$$r=log_2(q)$$

Turning briefly to FIG. 1, the pattern generator in an exemplary byte-oriented system, the unique pattern generator 1 determines the number of bits, q, of the sampling pattern, and likewise the number of repetitions of the sync pattern, in this exemplary case eight repetitions of a thirty-two bit sync pattern having a search length of eight bits. Accordingly, the generator 1 sends thirty-two bits of unique pattern S3 and three bits of index S5, determined according to the rules set forth above. The generator 1 then checks to see if the unique word has been sent the requisite number of times S7, eight in this exemplary case. Once the synchronization packet has been formed by the generator 1, the message is appended to the sync packet S9 to formulate the message to be transmitted.

The sync pattern generator I may be implemented in a variety of ways, depending upon the environment in which it is to be employed. In its simplest form, the generator 1 is merely a table of predefined constants that are entered into a program at the time the program of the generator is written. In systems where it may be desirable to change the unique word from time to time, a very simple program, including a nested loop structure, may be used to generate the sync pattern using a changeable unique word. It is also possible to use hardware to generate the pattern, if that configuration provides the most desirable system design. Such hardware could include, for example, counters and shift registers combined with some amount of random logic.

Figures 3, 4:
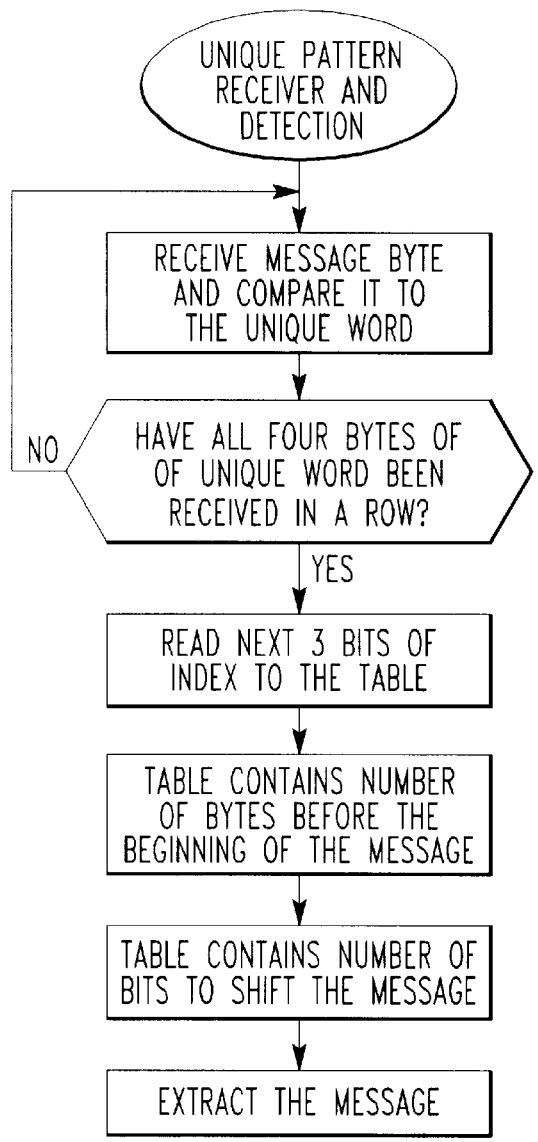
FIG. 3 is a flowchart corresponding to the operation of the present invention and in accordance with the state diagram shown in FIG. 2.
FIG. 4 is a lookup table used in conjunction with the present invention for providing final alignment of a message once synchronization has been detected.

From the sync packet, a lookup table is generated which uses the indices associated with each repetition of the sync pattern word to link the respective indices with the number of bytes to shift to reach the end of the sync packet, i.e., to reach the data portion of the message, and the number of bits to shift the data portion to achieve proper alignment. An exemplary lookup table for the exemplary sync packet set forth above is shown in FIG. 4. Depending on where in the sync packet a match is found, one can determine how many bytes into the repeated sync packet one has gone before finding sync. Based on that location, the number of bytes remaining to reach the data portion of the message is easily calculated as the difference between the sync location and the number of repetitions, q, of the sync pattern. It will be understood that the insertion of the indices must also be taken into account to achieve true alignment of the data portion of the message. Accordingly, a second set of numbers corresponding to the various indices is generated to determine an additional number of bits to shift the message to achieve true alignment. Briefly referring to FIG. 4, the lookup table showing byte and bit shifts corresponding to various locations within the exemplary sync packet are shown. For example, for index 101, i.e., the fifth repetition, the message should be shifted nine bytes (eight bytes of sync pattern and nine bits of interposed indices) to reach the end of the sync packet and an additional one bit to compensate for the insertion of the indices in the sync packet. Because this is a byte-oriented system, the system is constrained to using eight bit segments to determine byte shifts. Therefore, to compensate for leftover bits created by the interposed indices associated with each of the repeated segments of the sync packet, a second lookup must be performed to bring the data portion of the packet into true alignment. In this example, detection is achieved in the repetition number five of the sync pattern (really the sixth overall because the repetitions are counted starting at zero and ending at seven). Therefore, two repetitions, of four bytes each, remain. Additionally, there are nine bits of index data representing the index of repetitions five, six and seven, to be accounted for. Accordingly, the number of bytes that the message must be shifted is eight (representing the two remaining repeated segments) plus one (representing eight of the nine interposed index bits). Because the number of interposed index bits is not divisible by eight, there will necessarily, in some instances, be left over bit(s). In the instant example, one bit will be left over. Therefore, the lookup table must include a second lookup column indicating the number of bits to shift the message to compensate for the bits left over after byte-oriented determination of the initial shift. Thus, in the instant example, where there are nine interposed index bits, one bit remains for shifting to achieve true alignment of the data part of the message.

Upon reception of the message, the received serial data stream is examined using the predetermined sampling pattern having a length of q bits. In the example being used herein, the sampling size has been chosen to be eight bits, and the sampling is conducted as a series of eight-bit bytes. One of the eight preshifted sync patterns will appear properly byte aligned when sampled. When the sync pattern is found, the next three bits, i.e., the index, are used to index a lookup table, such as that shown in FIG. 5, which includes the number of additional whole bytes to read to reach the beginning of the data portion of the message and the number of bits the message must be further shifted, i.e., from zero to seven bits, to bring the data portion of the message into proper byte alignment. The message may then be immediately processed, or, alternatively, the lookup table information, i.e., the byte and bit shift data, can be saved for use in later extraction of the data portion of the message. Saving the lookup table information for later use provides the advantage of minimizing processor load, and is especially useful in times of high message traffic.

Figure 2:
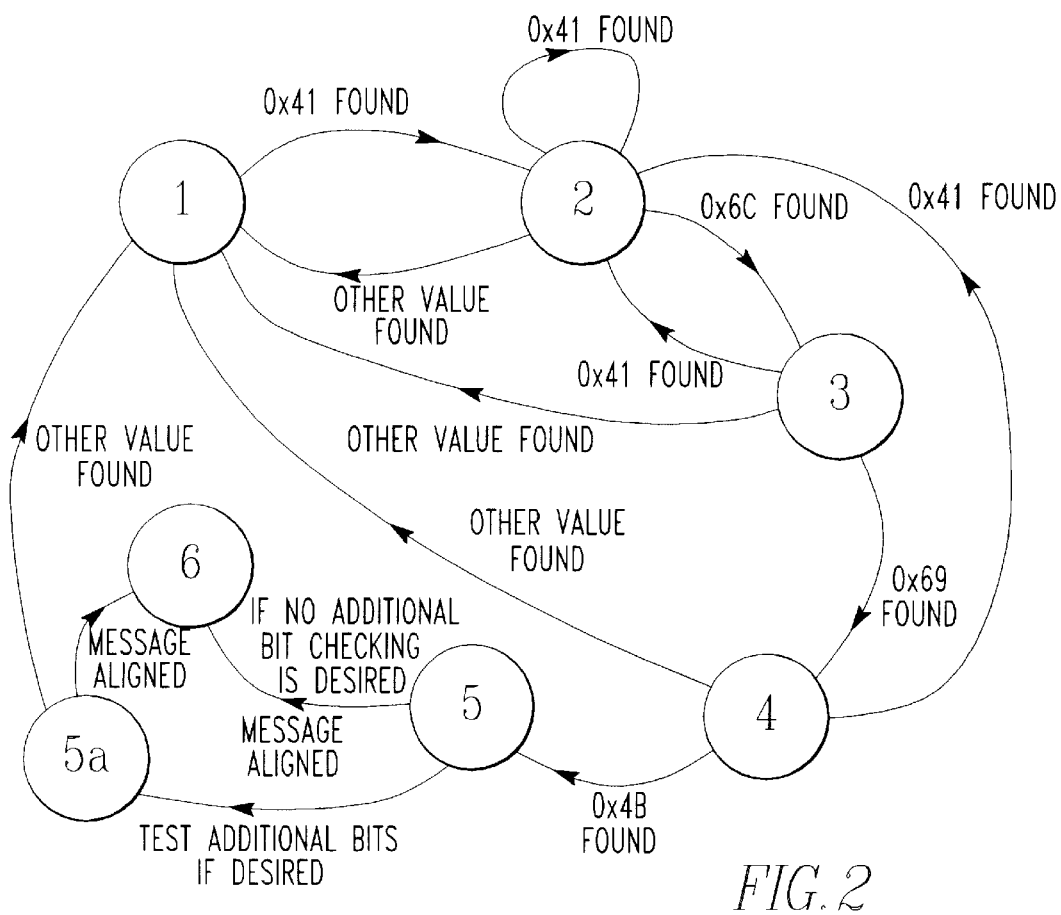
FIG. 2 is a state diagram showing the operational states of the present invention according to a preferred embodiment thereof.

FIG. 2 is a state diagram showing the operational states of the message synchronization method of the present invention. The objective of the search is to find the synchronization pattern, i.e., 0x416C694B in this example, in the serial data stream using unknown boundary, byte boundaries in this example, comparisons without the necessity for shifting bits during the search for the embedded synchronization pattern. State 1 is the state of the initial comparison of the serial data stream of the received serial data stream with the sampling pattern. As a result of the comparison, if byte 0x41 is found, i.e., the beginning of the sync pattern, the search proceeds to state 2 to look for the next sequential byte in the pattern, i.e., 0x6C. If 0x41 is not found in state 1, the operation will continue to compare bytes till the initial byte is found. Once the initial byte is found and the operation proceeds to state 2, if byte 0x41 is found again, the search returns to state 2. If byte 0x6C is found, the first two bytes have been found and the search progresses to state 3. If any value other than 0x41 or 0x6C is found in state 2, the message is not properly aligned and the search returns to state 1. At state 3, if byte 0x69 is found, the first three bytes of the sync pattern have been found and the search proceeds to state 4. If byte 0x41 is found at state 3, the search returns to state 2. If any other value is found at state three, the message is not properly aligned and the search is returned to state 1. At state 4, if byte 0x4B is found, the last byte of the sync pattern has been found and the search will proceed to state 5. If byte 0x41 is found again at state 4, the search returns to state 2. If any other value is found at state 4, the message is not properly aligned and the search returns to state 1. At state 5, it is determined whether or not to check the message using additional bit checking as described further hereinbelow. If no additional bit checking is required at state 5, then state 6 is reached and the message is aligned and synchronized. Once state 6 is reached, the message may be processed immediately using the lookup table, or stored for later processing. At state 5, if additional bit checking is desired, then the search enters state 5A, in which the additional bit checking is performed for the whole repeated sync pattern, i.e., 280 bits in the instant example, or some other predetermined lesser portion thereof. At state 5A, if the whole repeated sync pattern, or predetermined lesser portion thereof, is found to be aligned, state 6 is reached. If another value is found at state 5A, the search is returned to state 1 to begin the search anew. This process is further illustrated in the flowchart shown in FIG. 3.

In an alternative embodiment, if more protection against false sync detection than can be provided by a single repetition of the unique sync pattern used, is desired, the portions of the set of shifted unique synchronization patterns that are of the incorrect alignment may be used to expand the effective unique word length to include all of its repetitions. When normal detection, as set forth above, has been accomplished on one of the repeated sync patterns, the index for that sync pattern may be used to align the whole repeated sync pattern with the data stream. In this example, eight shifted copies of the whole 280-bit sync pattern are saved and accessed using the index to select the pattern that contains the detected unique word in the detected location. The whole 280 bits may then be compared to the appropriate portion of the data stream, effectively forming a 280-bit unique word, thereby greatly reducing the chance of false detection. However, it is noted that it is not necessary to use the entire 280 bits in this manner, as a lesser portion thereof may be specified. The number of bits or bytes checked after initial synchronization may be selected appropriately according to the problem being solved. In most cases, however, no additional checking is required or even useful.

Turning now to FIG. 5, a block diagram of an exemplary system in which the method of the present invention is utilized is shown. The message synchronization system of the present invention is particularly well suited to satellite or network communications systems, such as, for example, the Skylinx.DDS Digital DAMA system, by Scientific-Atlanta, Inc., of Atlanta, Ga. FIG. 5 shows the components of the synchronization packet generator of the present invention, which is typically resident at a transmitter end of the system. However, it will be understood that many systems typically include both transmit and receive capability. Accordingly, in a preferred embodiment, the present invention provides an apparatus that is capable of both generating (i.e., building) the sync packet and data packet, as well as of receiving and synchronizing a message in accordance with the present invention. Referring now to FIG. 5, at the transmit portion of the system 20, a unique word generator 52, which operates in accordance with the principles of the invention as discussed above, is used to generate the unique synchronization pattern for use in detection when the message is received. The generator 52 may be, for example, a software algorithm realized on a microprocessor 70 of the system 20. As set forth above, the generator 52 may comprise any of a number of alternative designs, including, for example, a table of predefined constants, a nested loop algorithm, or a hardware configuration, including counters, shift registers, and random logic. The unique word generator 52 generates the sync pattern and associated indices and is included with the data using a suitable mixer 60 to form a data packet to be transmitted. The packet is then transmitted via a communication medium, such as, for example, satellite or wire, to a receiver 75. The receiver 75 communicates the data packet including the sync packet to synchronization detector 80, which is also preferably realized on a programmed microprocessor of the system 20. The synchronization detector 80 operates in accordance with the above description to extract the sync packet from the data. There may also be a memory 85 associated with the system 20 for performing the memory functions described above, such as, for example, saving the packet and lookup table data for later use and/or processing. The detector also includes the lookup table (not shown) required for performing final alignment of the message, which is communicated from the detector via a data buffer 90.

The present invention allows a majority of the computation effort associated with data synchronization in a serial data stream to be accomplished at one time during message design, instead of many times during message synchronization. The synchronization packet used according to the present invention may be designed and tailored to the specific system in which it is being implemented, as required, by implementing a fixed set of rules as described above, during message design. Using the method of the instant invention reduces the processor load by 90 to 97 percent by implementing byte or other variable length comparisons according to the type of processor being used. No bits of the message packet need to be stored, accordingly, the method is inherently resistant to missed sync patterns occasioned by false starts that are commonplace in conventional synchronization systems.

While the present invention has been described herein in conjunction with specific embodiments thereof, many alternatives, modifications and variations will be apparent to those skilled in the art. Accordingly, the preferred embodiments of the invention as set forth herein are intended to be illustrative, not limiting. Various changes may be made without departing from the true spirit and full scope of the invention as defined in the appended claims.

What is claimed is:

1. A computer-implemented method for synchronizing a data stream, comprising the steps of:

generating a synchronization packet comprising a repeated synchronization pattern, the repeated synchronization pattern being n bits in length and being repeated q times, wherein each said repeated synchronization pattern has an index associated therewith, each said index having a length r, where $r=\log_2(q)$, rounded to the next higher integer, wherein r is relatively prime with respect to q and if r is not relatively prime with respect to q, r is increased to the next whole integer that is relatively prime with respect to q;

generating a serial message comprising said synchronization packet followed by said data stream;

transmitting said serial message;

receiving said transmitted serial message;

synchronizing said data stream of said transmitted serial message, the step of synchronizing comprising the steps of:

comparing a portion of a first received synchronization pattern of said synchronization packet in said serial message to a predetermined sampling pattern, said predetermined sampling pattern being q bits in length;

matching a portion of one of said repeated synchronization patterns with said sampling pattern, wherein if no match is found in said first received synchronization pattern, repeating said comparison for a next received synchronization pattern until a match is found between said sampling pattern and said portion of said repeated synchronization pattern;

shifting said serial message a predetermined number of bits based on the index associated with the matched synchronization pattern, said index being used to determine a number of n-bit segments to read to reach a beginning of said data stream and a number of bits, x, said data stream must be shifted to bring said data stream into alignment; and shifting said data stream by x bits to bring said data stream into alignment.

2. The method of claim 1, wherein using said index to determine a number of n-bit segments and number of bits, x, comprises:

pointing to an entry in a lookup table using the index associated with the matched synchronization pattern, said lookup table having preprogrammed entries entered therein corresponding to each said index, and containing the number of n-bit segments to read to reach the beginning of the data stream and the number of bits, x, said data stream must be shifted to bring said data stream into alignment, based on which of said indices is used.

3. The method of claim 2, wherein instead of shifting said data stream by x bits, the number x is stored in a memory for later processing by said computer.

4. The method of claim 2, wherein $4<=n<=64$.

5. The method of claim 4, wherein n is selected from the group consisting of:

4, 8, 16, 32 and 64.

6. The method of claim 4, wherein q=n.

7. The method of claim 2, comprising the further steps of:

providing the lookup table with a preprogrammed second sampling pattern corresponding to each said index, said second sampling pattern matching the synchronization packet, as shifted; and comparing the shifted synchronization packet with said second sampling pattern corresponding to the index associated with the matched synchronization pattern.

8. A computer-implemented method for synchronizing a data stream, comprising the steps of:

generating a synchronization packet comprising a repeated synchronization pattern, the repeated synchronization pattern being n bits in length and being repeated q times, wherein each said repeated synchronization pattern has an index associated therewith, each said index having a length r, where $r=\log_2(q)$, rounded to the next higher integer, wherein r is relatively prime with respect to q and if r is not relatively prime with respect to q, r is increased to the next whole integer that is relatively prime with respect to q; and storing said synchronization packet in a memory.

9. The method of claim 8, comprising the further steps of:

retrieving said synchronization packet from said memory;

generating a serial message comprising said synchronization packet followed by said data stream;

transmitting said serial message;

receiving said transmitted serial message;

synchronizing said data stream of said transmitted serial message, the step of synchronizing comprising the steps of:

comparing a portion of a first received synchronization pattern of said synchronization packet in said serial message according to a predetermined sampling pattern, said predetermined sampling pattern being q bits in length;

matching a portion of one of said repeated synchronization pattern with said sampling pattern, wherein if no match is found in said first received synchronization pattern, repeating said comparison for a next received synchronization pattern until a match is found between said sampling pattern and said portion of said repeated synchronization pattern;

shifting said serial message a predetermined number of bits based on the index associated with the matched synchronization pattern, said index being used to determine a number of n-bit segments to read to reach a beginning of said data stream and a number of bits, x, said data stream must be shifted to bring said data stream into alignment; and shifting said data stream by x bits to bring said data stream into alignment.

10. The method of claim 9, wherein using said index to determine a number of n-bit segments and number of bits, x, comprises:

pointing to an entry in a lookup table using the index associated with the matched synchronization pattern, said lookup table having preprogrammed entries entered therein corresponding to each said index, and containing the number of n-bit segments to read to reach the beginning of the data stream and the number of bits, x, said data stream must be shifted to bring said data stream into alignment, based on which of said indices is used.

11. The method of claim 10, wherein instead of shifting said data stream by x bits, the number x is stored in a memory for later processing by said computer.

12. The method of claim 9, wherein $4<=n<=64$.

13. The method of claim 12, wherein n is selected from the group consisting of:
4, 8, 16, 32 and 64.

14. The method of claim 12, wherein q=n.

15. The method of claim 10, comprising the further steps of:
providing the lookup table with a preprogrammed second sampling pattern corresponding to each said index, said second sampling pattern matching the synchronization packet, as shifted; and
comparing the shifted synchronization packet with said second sampling pattern corresponding to the index associated with the matched synchronization pattern.

16. An article of manufacture, comprising:
a computer usable medium having a computer readable program embodied therein for synchronizing a data stream, the computer readable program in said article of manufacture comprising:
computer readable program code for generating a synchronization packet comprising a repeated synchronization pattern, the repeated synchronization pattern being n bits in length and being repeated q times, wherein each said repeated synchronization pattern has an index associated therewith, each said index having a length r, where $r=\log_2(q)$, rounded to the next higher integer, wherein r is relatively prime with respect to q and if r is not relatively prime with respect to q, r is increased to the next whole integer that is relatively prime with respect to q;
computer readable program code for generating a serial message comprising said synchronization packet followed by said data stream;
computer readable program code for transmitting said serial message;
computer readable program code for receiving said transmitted serial message;
computer readable program code for synchronizing said data stream of said transmitted serial message, the code for synchronizing comprising:
computer readable program code for comparing a portion of a first received synchronization pattern of said synchronization packet in said serial message to a predetermined sampling pattern, said predetermined sampling pattern being q bits in length;
computer readable program code for matching a portion of one of said repeated synchronization pattern with said sampling pattern, wherein if no match is found in said first received synchronization pattern, repeating said comparison for a next received synchronization pattern until a match is found between said sampling pattern and said portion of said repeated synchronization pattern;
computer readable program code for shifting said serial message a predetermined number of bits based on the index associated with the matched synchronization pattern, said index being used to determine a number of n-bit segments to read to reach a beginning of said data stream and a number of bits, x, said data stream must be shifted to bring said data stream into alignment; and
computer readable program code for shifting said data stream by x bits to bring said data stream into alignment.

17. The article of manufacture of claim 16, wherein using said index to determine a number of n-bit segments and number of bits, x, comprises:
computer readable program code for pointing to an entry in a lookup table using the index associated with the matched synchronization pattern, said lookup table having preprogrammed entries entered therein corresponding to each said index, and containing the number of n-bit segments to read to reach the beginning of the data stream and the number of bits, x, said data stream must be shifted to bring said data stream into alignment, based on which of said indices is used.

18. The article of manufacture of claim 17, wherein instead of shifting said data stream by x bits, the number x is stored in a memory for later processing by said computer.

19. The article of manufacture of claim 17, wherein $4<=n<=64$.

20. The article of manufacture of claim 19, wherein n is selected from the group consisting of: 4, 8, 16, 32 and 64.

21. The article of manufacture of claim 19, wherein q=n.

22. The article of manufacture of claim 17, further comprising:
computer readable program code for providing the lookup table with a preprogrammed second sampling pattern corresponding to each said index, said second sampling pattern matching the synchronization packet, as shifted; and
computer readable program code for comparing the shifted synchronization packet with said second sampling pattern corresponding to the index associated with the matched synchronization pattern.

23. An article of manufacture, comprising:
a computer usable medium having a computer readable program embodied therein for synchronizing a data stream, the computer readable program in said article of manufacture comprising:
computer readable program code for generating a synchronization packet comprising a repeated synchronization pattern, the repeated synchronization pattern being n bits in length and being repeated q times, wherein each said repeated synchronization pattern has an index associated therewith, each said index having a length r, where $r=\log_2(q)$, rounded to the next higher integer, wherein r is relatively prime with respect to q and if r is not relatively prime with respect to q, r is increased to the next whole integer that is relatively prime with respect to q; and
computer readable program code for storing said synchronization packet in a memory.

24. The article of manufacture of claim 23, further comprising:
computer readable program code for retrieving said synchronization packet from said memory;
computer readable program code for generating a serial message comprising said synchronization packet followed by said data stream;
computer readable program code for transmitting said serial message;
computer readable program code for receiving said transmitted serial message;

computer readable program code for synchronizing said data stream of said transmitted serial message, the code for synchronizing comprising:

computer readable program code for comparing a portion of a first received synchronization pattern of said synchronization packet in said serial message according to a predetermined sampling pattern, said predetermined sampling pattern being q bits in length;

computer readable program code for matching a portion of one of said repeated synchronization patterns with said sampling pattern, wherein if no match is found in said first received synchronization pattern, repeating said comparison for a next received synchronization pattern until a match is found between said sampling pattern and said portion of said repeated synchronization pattern;

computer readable code for shifting said serial message a predetermined number of bits based on the index associated with the matched synchronization pattern, said index being used to determine a number of n-bit segments to read to reach a beginning of said data stream and a number of bits, x, said data stream must be shifted to bring said data stream into alignment; and computer readable code for shifting said data stream by x bits to bring said data stream into alignment.

25. The article of manufacture of claim 24, wherein the code for using said index to determine the number of n-bit segments and number of bits, x, comprises:

computer readable program code for pointing to an entry in a lookup table using the index associated with the matched synchronization pattern, said lookup table having preprogrammed entries entered therein corresponding to each said index, and containing the number of n-bit segments to read to reach the beginning of the data stream and the number of bits, x, said data stream must be shifted to bring said data stream into alignment, based on which of said indices is used.

26. The article of manufacture of claim 25, wherein instead of shifting said data stream by x bits, the number x is stored in a memory for later processing by said computer.

27. The article of manufacture of claim 24, wherein 4<=n<=64.

28. The article of manufacture of claim 27, wherein n is selected from the group consisting of: 4, 8, 16, 32 and 64.

29. The article of manufacture of claim 27, wherein q=n.

30. The article of manufacture of claim 25, further comprising:

computer readable program code for providing the lookup table with a preprogrammed second sampling pattern corresponding to each said index, said second sampling pattern matching the synchronization packet, as shifted; and computer readable program code for comparing the shifted synchronization packet with said second sampling pattern corresponding to the index associated with the matched synchronization pattern.

31. An apparatus for synchronizing a data stream, comprising:

a unique word generator for generating a repeated synchronization pattern, each repeated synchronization pattern being n bits in length and being repeated q times, wherein each said repeated synchronization pattern has an index associated therewith, each said index having a length r, where $r=\log_2(q)$, rounded to the next higher integer, wherein r is relatively prime with respect to q and if r is not relatively prime with respect to q, r is increased to the next whole integer that is relatively prime with respect to q;

a mixer for combining said synchronization pattern with said data stream; and a detector for detecting and synchronizing said data stream by comparing a portion of a first received synchronization pattern to a predetermined sampling pattern, said predetermined sampling pattern being q bits in length; matching a portion of one of said repeated synchronization pattern with said sampling pattern, wherein if no match is found in said first received synchronization pattern, repeating said comparison for a next received synchronization pattern until a match is found between said sampling pattern and said portion of said repeated synchronization pattern; shifting said serial message a predetermined number of bits based on the index associated with the matched synchronization pattern, said index being used to determine a number of n-bit segments to read to reach a beginning of said data stream and a number of bits, x, said data stream must be shifted to bring said data stream into alignment; and shifting said data stream by x bits to bring said data stream into alignment.

32. The apparatus of claim 31, further comprising:

a transmitter for transmitting the combined synchronization pattern and data stream; and a receiver for receiving the combined synchronization pattern and data stream.

33. The apparatus of claim 31, further comprising:

a memory coupled to said detector.

34. The apparatus of claim 33, wherein said memory stores a lookup table containing information relating to shifting of the combined synchronization pattern and data stream.

35. The apparatus of claim 33, wherein said memory stores said synchronization pattern.

36. The apparatus of claim 34, wherein 4<n<64.

37. The apparatus of claim 36, wherein n is selected from the group consisting of: 4, 8, 16, 32 and 64.

* * * * *